April 6, 1948.  W. WATERMAN  2,439,116
AUTOMATIC CUTOFF
Filed Jan. 2, 1942  2 Sheets-Sheet 1
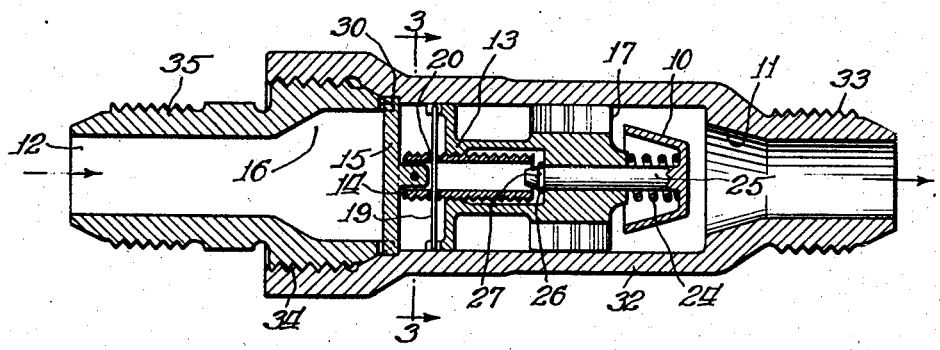
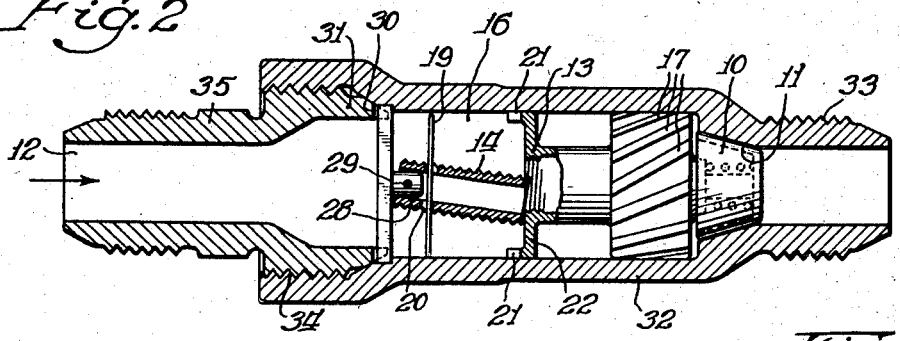
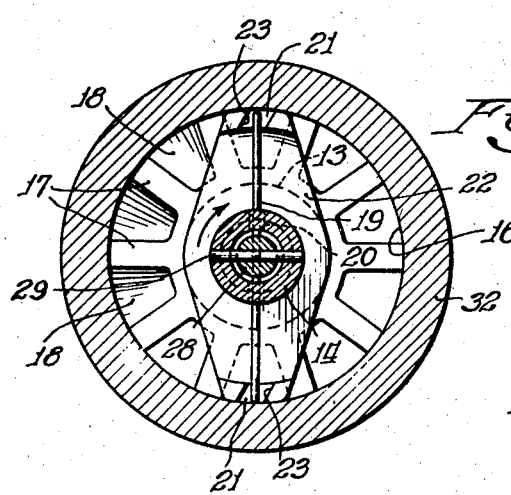
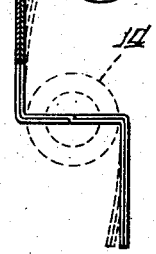
Inventor:
William Waterman
By Roland C. Rihm
Atty.

April 6, 1948.  W. WATERMAN  2,439,116
AUTOMATIC CUTOFF
Filed Jan. 2, 1942  2 Sheets-Sheet 2
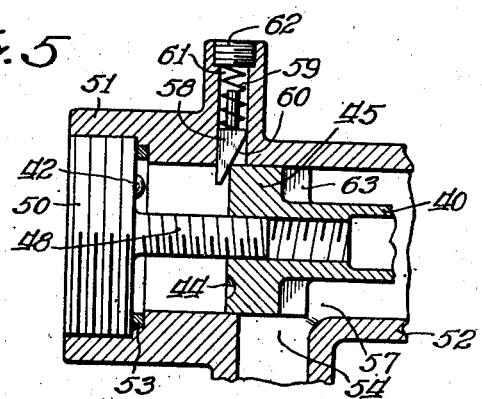
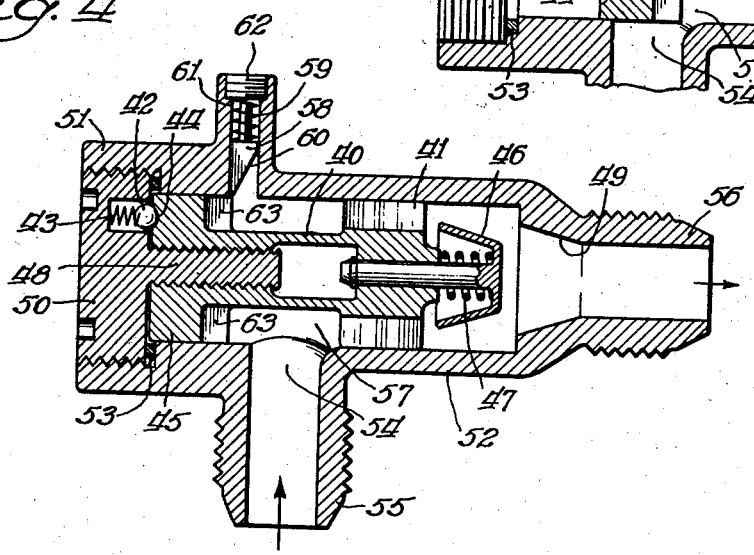
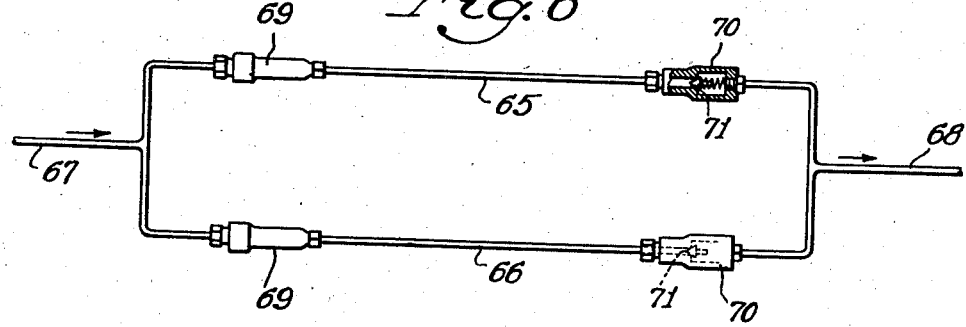
Inventor:
William Waterman
By: Roland C Lehms
Atty.

Patented Apr. 6, 1948

2,439,116

UNITED STATES PATENT OFFICE 2,439,116

AUTOMATIC CUTOFF

William Waterman, Chicago, Ill.

Application January 2, 1942, Serial No. 425,427

20 Claims. (Cl. 137—152)

This invention relates to devices for interrupting flow in hydraulic and other fluid lines, and among other objects aims to provide an improved device of this character which is not affected by inertia and gravitational forces.

The nature of the invention may be readily understood by reference to an illustrative device embodying the invention and shown in the accompanying drawings.

In said drawings

Fig. 1 is a longitudinal section of a device installed in a fluid line;

Fig. 2 is a similar longitudinal section showing certain parts of the device in elevation;

Fig. 3 is a transverse section taken on the line 3—3 of Fig. 1;

Fig. 4 is a longitudinal section of a different form of device;

Fig. 5 is an enlarged longitudinal section of a portion of the device shown in Fig. 4;

Fig. 6 is a diagrammatic view of an arrangement of fluid lines equipped with the illustrative device; and Fig. 7 is an elevation of a bi-metallic spring.

Among other uses the illustrative device is designed to check flow in hydraulic lines in the event of breakage of the line. In air craft, for example, it is important to prevent loss of oil, fuel or other fluid in the event the line is broken by projectiles, vibration, or otherwise. Lines provided with self-sealing material have limited use because of their large size or bulk. Hydraulic lines for operating various devices are generally exposed and cannot be protected.

The present device is peculiarly suited for use on air craft (though its use is not so limited) because its operation is not influenced by nor dependent upon gravity, inertia, or vibration.

Operation of the illustrative device to close a line (which has been broken or punctured) depends upon development of forces which cannot be exerted either by gravity, vibration, or inertia regardless of their direction and including the high inertia forces (as high as seven times gravity) sometimes developed in air craft on power dives, etc. By inertia forces is meant, of course, the forces of acceleration and deceleration. In this case the excess energy and velocity of moving fluid such as oil or fuel, represented by flow in excess of the normal or maximum ordinary flow (caused by break in the line) is utilized to exert a directed or specifically applied operating force which cannot be developed as a component of either inertia, gravity or vibration. Such operating force is independent of pressures, depending mainly on a predetermined rate of flow which results immediately and directly from breakage of a line. This principle is applied in the present device by developing by means of such predetermined or excess flow, specific forces, here represented by unidirectional rotational forces.

As here shown (Figs. 1 and 2) the valve 10 is quickly advanced into contact with its seat 11 to close a line 12 by relative rotation between the internally threaded valve carrier 13 (on which valve 10 is mounted) and the screw 14. The latter, in the present case, is non-rotatably mounted on a narrow support 15 extending across the chamber or passage 16 but not substantially obstructing it, and the internally threaded carrier 13 is rotatable around the screw. The valve carrier is provided with means in the form of vanes 17 inclined to the axis of rotation of the member and lying in the path of flow of the fluid as it travels through the line. The portion of the member 13 carrying the vanes is advantageously enlarged so as practically to close the chamber 16 (except for clearance sufficient to provide a freely slidable fit) so as to oblige substantially all the fluid passing through the line to traverse the spaces 18 between the vanes. The cylindrical surface of the vanes also serves as a guide against the cylindrical wall of the chamber 16 to guide valve 10 accurately towards its seat. The vanes may readily be formed on the valve carrier 13 by milling slots, constituting the passage between the vanes 17, at the proper angle of inclination to the valve carrier.

It is apparent from the foregoing that it is excess or unusual flow (which is the critical condition) and not pressure conditions which cause operation of the device. The flow of fluid, in this case from left to right in Figs. 1 and 2, through the line 12 at a normal rate is prevented from rotating member 13 on its screw by a releasable latch here shown in the form of a spring wire 19. The latter is, in this case, held non-rotatable relative to screw 14 by passing transversely through perforations 20 therein, and its ends seat loosely in notches 21 formed in a flange depending from web 22 on member 13 when the latter is in retracted or open position (see Fig. 1). The web 22 is narrow and does not substantially block the passage through chamber 16 (see Fig. 3). Its ends have a sliding fit with the walls of chamber 16 and serve additionally as guides for the valve. Excess velocity of fluid through the line (caused by drop in back pressure pursuant to breakage or puncture of the line) exerts a substantially greater than normal rotational force on vanes 17. This force is sufficient to flex the wire (under the force exerted on its ends in the notches 21) until the latter pull over the ends of the wire, thereby releasing the member 13 and allowing it freely to rotate to close the valve. The faces 23 of the notches are advantageously inclined to avoid any gripping of the wire by corners of the notches. The size or stiffness of the spring wire 19 employed for any particular valve may advantageously be adjusted to the character of fluid in the line and its excess rate of flow.

The screw 14 prevents sudden closing of the valves after its release and thereupon prevents shock which under the high pressures used in some lines, might be high enough to rupture the line. Means are advantageously employed to prevent unseating of the valve by vibration or other causes after it is closed. In the present case, screw 14 is advantageously used for this purpose. It is relatively loosely mounted on bar 15 and adjusted in length so that as the valve seats the member 13 completely clears or unscrews itself from the screw 14 allowing the latter to fall out of register with the screw threads and, therefore, prevent backing off of the valve through any cause. Valve 10 advantageously is made movable slightly relative to the member 13 so as to permit the latter to rotate slightly under its own momentum after the valve is seated, thus insuring complete unscrewing from screw 14 to permit the latter to move out of register with the screw threads. For this purpose valve 10 is resiliently mounted on member 13. As here shown, a spring 24 is located inside the hollow interior of the valve and seated against the end of member 13. The stem 25 of the valve passes through a central bore in member 13 and is fastened by locking ring 26 seated in groove 27 in the valve stem. Preferably spring 24 is pre-tensioned so as to exert a continuous resilient seating force against the seat when the valve has been locked in closed position.

The loose mounting of screw 14 is in this instance effected by mounting it over a stud 28 somewhat smaller than the internal diameter of the screw 14 and connecting it with the stud by a transverse pin 29. This pin also serves to connect the valve as a unit to the transverse bar 15. The latter is removably held in position by being seated in notches 30 formed in the extremity of fitting 31. The notches may be deep so as not to interfere with tight seating of the joint surfaces at the coupling and also to avoid tight clamping of the bar which might cause binding of the member 13 against the walls of chamber 16.

The device may be advantageously provided with an integral housing 32 which provides a chamber 18, the seat 11 and terminal fittings 33 and 34 of standard type. The nipple 35 carrying the notches 30 is also preferably of standard type.

To restore the valve to normal operating position it is simply necessary to uncouple the unit at the fitting 34 to release bar 15 and screw 14. This releases the valve and the rotatable member 13 which can then be reassembled on screw 14 in its normal position.

It will be noted that operation of the valve to close the line is independent of and not influenced by forces of gravity, inertia, or vibration and that the forces which rotate the valve to closed position cannot be developed as components of inertia, gravitational forces or vibration, but require not mere pressure but actual flow of fluid through the line substantially in excess of normal flow. Except as presently pointed out, operation depends on rate of flow not on pressures, high or low, or on pressure differences. The more viscous the fluid the greater the rotating force on member 13 and the lower the rate of flow necessary to release member 13. This may be compensated for by using a spring 19 which releases less easy, the more viscous the fluid and vice versa. For example, as shown in Fig. 7, the spring may be made from bi-metallic strips, increasing its curvature on rise in temperature (as shown in dotted lines) so as to pull out of the notches more easily the higher the temperature. Also the spring may be Z-shaped with its intermediate portion lying in screw 14. This shape is less likely to distort permanently when in use.

After the valve has been closed, it is locked on its seat under resilient pressure against opening by vibration, gravity, or inertia.

In Fig. 4 a different form of device is shown. In this device the rotating valve carrier 40, which carries the axially inclined fluid operated vanes 41, is normally held against rotation by normal fluid flow by a latch in the form of a light weight ball catch 42. The vanes 41 are arranged similarly to those in Figs. 1, 2 and 3. The ball is pressed by a light spring 43 into a recess 44 in the base 45 of member 40. The valve 46 and its mounting on its carrier 40 may advantageously be similar to that in the device shown in Figs. 1 and 2, and the spring 47 is advantageously pre-tensioned for the same reasons as that in connection with the device of Figs. 1 and 2. The stationary screw 48 around which the member 40 rotates in closing the valve against its seat 49 is advantageously carried on a plug 50 screwed into the threaded extremity 51 of the housing 52. A gasket 53 seals the housing against leakage around the plug. The inlet 54 to the housing is preferably at a point beyond the plug 50 and the base 45 thereby permitting the valve to be removed as a unit to restore it to operating position without requiring disconnecting at either the inlet fitting 55 or outlet fitting 56. In the present case the inlet 54 enters the side of housing 52 at an angle to the valve body and the latter is provided with ample space 57 around the same so as not to prevent passage of fluid.

Catch 42 is designed to prevent rotation of the valve carrier 40 under the forces exerted by normal fluid flow and to release the body only upon the excess flow resulting from breaking or puncture of the line. Upon such release valve carrier 40 is rotated by means of the force exerted on the vanes 41 until the valve 46 engages its seat 49. In such closed position the valve body is locked against return or unseating of the valve by an obstruction which engages the body in valve-closed position. Such obstruction is here shown in the form of a latch 58 which engages carrier 40, in this case by sliding under the base 45 when the latter clears the latch. The latch is light in weight and the spring 59, which presses it forward, is sufficiently strong so that its operation cannot be neutralized by inertia forces. Preferably the operative face of the latch is inclined to provide a cam surface 60 which facilitates entry of the latch into locking position. The pitch of the inclined surface 60 is made slight enough so that vibration or inertia cannot create a component sufficient to retract the latch from locking position. The latch may be inserted through an opening 61 in the housing and held in position by closure plug 62.

While both catch 42 and latch 58 are subjected to inertia forces their mass is so low that proper operation is not prevented.

The resilient mounting of valve 46 on the carrier 40 similarly to that in Fig. 1 provides a continuous resilient pressure of the valve on its seat after locking in closed position.

In open position the forward edge of the base 45 holds the latch 58 in retracted position (Fig. 4). To avoid undue throttling of the inlet 54 by base 45 as it closes (see Fig. 5), the forward edge of the base may have a plurality of slots 63 therein. The slots should be narrower than the width of latch 58.

The illustrative device advantageously permits the use of multiple lines such as multiple oil lines or multiple fuel lines which are not rendered inoperative in the event of breakage or puncture of one of the lines. In Fig. 6 multiple lines, in this case dual lines 65 and 66, are employed to traverse critical or vulnerable regions. These lines merge at their ends in inlet line 67 and outlet line 68. An automatic cut-off unit 69 of the type above described is placed in each of the multiple lines. If one line be fractured, excess flow in that line will cause the operation of the cut-off, as above described. To prevent escape of fluid around the other side of the cut-off in the fractured line, ordinary check valves 70 are placed in each of the lines beyond the cut-offs in the direction of the valve and the rotatable member 13 which can then be reassembled on screw 14 in its normal position. If necessary, a fresh wire 19 may be inserted.

It will be noted that operation of the valve to close the line is independent of and not influenced by forces of gravity, inertia, or vibration and that the forces which rotate the valve to closed position cannot be developed as components of inertia, gravitational forces or vibration, but require not mere pressure but actual flow of fluid through the line substantially in excess of normal flow. Operation does not depend on pressures, high or low, or on pressure differences. When adjusted for a certain flow the device may be employed under any pressure conditions. Pressure changes and differences caused by variations in viscosity of the fluid do not influence the device. Operation depends solely on the rate of flow.

After the valve has been seated, it is locked in seated position and cannot be opened either by vibration, gravity, or inertia.

In Fig. 4 a different form of device is shown. In this device the rotating valve carrier 40, which carries the axially inclined fluid operated vanes 41, is normally held against rotation by normal fluid flow by a latch in the form of a light weight ball catch 42. The vanes 41 are arranged similarly to those in Figs. 1, 2 and 3. The ball is pressed by a light spring 43 into a recess 44 in the base 45 of member 40. The valve 46 and its mounting on its carrier 40 may advantageously be similar to that in the device shown in Figs. 1 and 2, and the spring 47 is advantageously pretensioned for the same reasons as that in connection with the device of Figs. 1 and 2. The stationary screw 48 around which the member 40 rotates in closing the valve against its seat 49 is advantageously carried on a plug 50 screwed into the threaded extremity 51 of the housing 52. A gasket 53 seals the housing against leakage around the plug. The inlet 54 to the housing is preferably at a point beyond the plug 50 and the base 45 thereby permitting the valve to be removed as a unit to restore it to operating position without requiring disconnecting at either the inlet fitting 55 or outlet fitting 56. In the present case the inlet 54 enters the side of housing 52 at an angle to the valve body and the latter is provided with ample space 57 around the same so as not to prevent passage of fluid.

Catch 42 is designed to prevent rotation of the valve carrier 40 under the forces exerted by normal fluid flow and to release the body only upon the excess flow resulting from breaking or puncture of the line. Upon such release valve carrier 40 is rotated by means of the force exerted on the vanes 41 until the valve 46 engages its seat 49. In such closed position the valve body is locked against return or unseating of the valve by an obstruction which engages the body in valve-closed position. Such obstruction is here shown in the form of a latch 58 which engages carrier 40, in this case by sliding under the base 45 when the latter clears the latch. The latch is light in weight and the spring 59, which presses it forward, is sufficiently strong so that its operation cannot be neutralized by inertia forces. Preferably the operative face of the latch is inclined to provide a cam surface 60 which facilitates entry of the latch into locking position. The pitch of the inclined surface 60 is made slight enough so that vibration or inertia cannot create a component sufficient to retract the latch from locking position. The latch may be inserted through an opening 61 in the housing and held in position by closure plug 62.

While both catch 42 and latch 58 are subjected to inertia forces their mass is so low that proper operation is not prevented.

The resilient mounting of valve 46 on the carrier 40 similarly to that in Fig. 1 provides a continuous resilient pressure of the valve on its seat after locking in closed position.

In open position the forward edge of the base 45 holds latch 58 in retracted position (Fig. 4). To avoid undue throttling of the inlet 54 by base 45 as it closes (see Fig. 5), the forward edge of the base may have a plurality of slots 63 therein. The slots should be narrower than the width of latch 58.

The illustrative device advantageously permits the use of multiple lines such as multiple oil lines or multiple fuel lines which are not rendered inoperative in the event of breakage or puncture of one of the lines. In Fig. 6 multiple lines, in this case dual lines 65 and 66, are employed to traverse critical or vulnerable regions. These lines merge at their ends in inlet line 67 and outlet line 68. An automatic cut-off unit 69 of the type above described is placed in each of the multiple lines. If one line be fractured, excess flow in that line will cause the operation of the cut-off, as above described. To prevent escape of fluid around the other side of the cut-off in the fractured line, ordinary check valves 70 are placed in each of the lines beyond the cut-offs in the direction of flow so as to prevent reverse flow in the fractured line. Any reliable form of check valve may be employed and that here shown is illustrative only. It comprises a spring pressed valve 71 which permits flow in the normal direction but prevents flow in the reverse direction. Three or more lines may be similarly connected to provide additional safety. Continued operation will be insured so long as one line remains intact.

Obviously, the invention is not limited to the details of the illustrative devices since these may be variously modified. Moreover, it is not indispensible that all features of the invention be used conjointly since various features may be used to advantage in different combinations and sub-combinations.

Having described my invention, I claim:

1. A cutoff device for automatically closing a fluid line comprising in combination a valve, a housing therefor, a threaded member rotatable by flow of fluid in said line to close said line, a stationary screw carried in said housing on which said member is threaded, said member rotating about said screw in closing said valve, and a catch for holding said member against rotation on said screw during normal fluid flow, said catch being releasable upon flow in excess of normal to permit closing of said valve.

2. A cutoff device for automatically closing a fluid line comprising in combination a valve, a housing therefor, a valve carrier rotatable in said housing to close said valve, said carrier having fluid passages therein at an angle to the direction of fluid flow to cause rotation of said carrier by flow of fluid through said housing, and means for limiting effective rotation of said carrier by normal fluid flow, said means being releasable upon flow in excess of normal to permit closing of said valve.

3. A cutoff device for automatically closing a fluid line comprising in combination a valve, a housing therefor, a valve carrier in said housing and rotatable by flow of fluid through said housing to close said valve, a resilient device engaging said carrier to prevent rotation of the latter under normal fluid flow but releasable upon flow in excess of normal to permit rotation of said carrier to close the valve.

4. A cutoff device for automatically closing a fluid line comprising in combination a valve, a housing therefor, a threaded valve carrier rotatable to close said valve, a screw fixed against axial movement in said housing on which said carrier is threaded, said screw having its length limited so that the carrier will unthread therefrom upon closing of the valve, said screw being movably supported in said housing so as to deflect when unthreaded and to lock the valve and carrier in closed position.

5. A cutoff device for automatically closing a fluid line comprising in combination a valve, a housing therefor, a threaded valve carrier rotatable to close said valve, a screw fixed against axial movement in said housing on which said carrier is threaded, said screw having its length limited so that the carrier will unthread therefrom upon closing of the valve, said screw being movably supported in said housing so as to deflect when unthreaded and to lock the valve and carrier in closed position, and a resilient wire engaging said carrier to prevent rotation thereof, said wire being deflectible under fluid flow in excess of normal to release said carrier.

6. A cutoff device for automatically closing a fluid line comprising in combination a valve, a housing therefor, a member rotatable by flow of fluid in said line to close said valve, and a releasable catch for holding said member against rotation during normal fluid flow, said catch changing its contour responsive to variations in temperature to compensate for variations in effect of flow on said rotatable member due to variations in viscosity of the fluid resulting from changes in temperature of the fluid.

7. A cut-off device for automatically closing a fluid line comprising in combination a valve means rotatable by the flow of fluid in said line for closing said valve, a device for holding said means against operation under the maximum normal fluid flow, and releasable means associated with said device responsive to flow in excess of maximum normal flow to permit rotation of said means to close said valve.

8. A cut-off device for automatically closing a fluid line comprising in combination a valve means rotatable by the flow of fluid in said line for closing said valve, means for holding said valve open against normal flow and releasable under flow in excess of normal to permit closing of said valve, and a locking device operated by rotation of said means for locking said valve in closed position.

9. A cut-off device for automatically closing a fluid line comprising in combination a valve, a housing therefor, a valve carrier movable in said housing to close the valve, and locking means for preventing reverse movement of said carrier on closing of the valve, said valve having a resilient mounting on said carrier so as to exert with the end of said locking means a resilient pressure on its seat when closed.

10. A cut-off device for automatically closing fluid lines comprising in combination valve means rotatable by the flow of fluid in said line and adapted upon flow in excess of normal to close, a device for holding said valve means against operation under normal fluid flow, releasable means associated with said device and responsive to flow in excess of normal to permit rotation of said valve means for closing the valve, and means for holding said valve on its seat after closing.

11. A cut-off device for fluid lines and the like comprising in combination a valve housing adapted to be placed in a fluid line, a valve in said housing movable by the flowing fluid to close the line, means for holding the valve open against forces of inertia, and resilient means resisting movement of the valve by normal fluid flow and yieldable upon fluid flow in excess of normal to release said valve for closing by the flowing fluid.

12. A cut-off device for fluid lines and the like comprising in combination a valve housing adapted to be placed in a fluid line, a valve in said housing movable under the action of the flowing fluid to close the line, means for positively holding the valve open against inertia forces and the action of the flowing fluid and adapted to release said valve to close upon predetermined movement of the valve under the action of the flowing fluid, and resilient means resisting said movement of the valve and yieldable under the action of fluid flow in excess of normal to effect the aforesaid predetermined valve movement to release the valve from said holding means.

13. A cut-off device for automatically closing a fluid line comprising in combination a valve movable by normal fluid flow to close said line, a device for holding said valve against closing under inertia forces but not against the force of maximum normal fluid flow, releasable means associated with said device to hold said valve open against the force of maximum normal fluid flow and responsive to the force of flow in excess of maximum normal flow to permit closing of said valve, and means for compensating for variations in the force of fluid flow on said releasable means due to variations in temperature of the fluid.

14. A cut-off device for automatically closing a fluid line comprising in combination a valve movable by the force of normal fluid flow to close said line, a device for holding said valve open against closing under inertia forces but not against the force of maximum normal fluid flow, and releasable means associated with said device to hold said valve open against the force of maximum normal fluid flow and responsive to the forces on said valve of fluid flow in excess of the maximum normal flow to release said valve and permit it to close.

15. A fluid operated latch for controlling movement of an element in response to the rate of flow of fluid in a line comprising means mounting the element for rotation and holding it against movement in the direction of fluid flow for release upon rotation through a predetermined angle, means responsive to fluid flow for causing the element to rotate, and means adapted to become progressively stressed by rotation of the element and thereby oppose rotation with increasing resistance as the rate of fluid flow increases.

16. A cut-off device for fluid lines and the like comprising in combination a valve housing adapted to be placed in a fluid line and having a valve seat, a valve in said housing normally positioned in spaced relation to the seat and arranged to move toward said seat in response to fluid flow, and means for releasably holding the valve in such spaced relation to said seat comprising a latch for positively holding the valve in normal position against inertia forces and other forces due to flow less than a predetermined rate, and means adapted to be progressively stressed in proportion to the rate of flow and to release the latch in response to said predetermined rate of flow.

17. A cut-off device for fluid lines and the like comprising in combination a valve housing adapted to be placed in a fluid line and having a valve seat, a valve in said housing normally positioned in spaced relation to the seat and arranged to move toward said seat in response to fluid flow, means for releasably holding the valve in such spaced relation to said seat comprising interengaged parts carried by the valve and housing respectively permitting rotation of the valve and positively preventing release of the valve from said spaced relation to its seat until the valve has rotated through a predetermined angle, means associated with the valve to cause it to rotate through said angle in response to fluid flow in excess of a predetermined rate, and means for resisting rotation of the valve until fluid flow exceeds a predetermined higher rate.

18. A cut-off device for fluid lines and the like comprising in combination a valve housing adapted to be placed in a fluid line and having a valve seat, a valve in said housing movable toward said seat under the action of the flowing fluid, releasable means for positively holding the valve from movement toward said seat in response to inertia forces and the action of the flowing fluid and adapted to move to release said valve in response to flow in excess of a predetermined rate, and resilient means resisting said movement of the releasable means and yieldable under the action of fluid flow in excess of normal to effect the aforesaid movement of the releasable means to release the valve.

19. A fluid operated latch for controlling movement of an element in response to the rate of flow of fluid in a line comprising means movable in response to fluid flow, means operative during such movement to hold the element against movement in the direction of fluid flow and adapted to release the element when such movement exceeds a predetermined amount, and means adapted to become progressively stressed by such movement and thereby oppose the same with increasing resistance as the rate of fluid flow increases.

20. A cut-off device for automatically closing a fluid line upon predetermined excess flow of fluid therein comprising in combination a rotatable valve carrier carrying a valve, a housing therefor adapted to be placed in the fluid line, said valve carrier having surfaces acted on by the flowing fluid and arranged to rotate the valve carrier, an anchor device in said housing, means connecting the valve carrier to said anchor device to hold the valve open and releasable on predetermined rotation of the valve carrier, said means including a device resisting rotation of said valve carrier under the forces exerted by normal fluid flow and yieldable under forces exerted on said valve carrier by excess fluid flow sufficiently for said predetermined rotation thereby to release said valve carrier.

WILLIAM WATERMAN.

REFERENCES CITED

The following references are of record in the file of this patent:

UNITED STATES PATENTS

| Number | Name | Date |
|---|---|---|
| 524,393 | Neely | Aug. 14, 1894 |
| 1,788,368 | Brown | Jan. 13, 1931 |
| 2,041,863 | Rhodes | May 26, 1936 |
| 2,063,809 | Isaacs | Dec. 8, 1936 |
| 2,071,969 | Diescher | Feb. 23, 1937 |
| 2,093,015 | Madden | Sept. 14, 1937 |
| 2,127,849 | Stone | Aug. 23, 1938 |
| 2,139,050 | Vickers | Dec. 6, 1938 |
| 2,253,580 | Rahe | Aug. 26, 1941 |

FOREIGN PATENTS

| Number | Country | Date |
|---|---|---|
| 1,217 | Great Britain | 1911 |
| 107,434 | Great Britain | 1917 |